United States Patent [19]

Metz

[11] Patent Number: 4,587,882
[45] Date of Patent: May 13, 1986

[54] PNEUMATIC RECUPERATOR MECHANISM FOR A GUN BARREL

[75] Inventor: Josef Metz, Neuss, Fed. Rep. of Germany

[73] Assignee: Rheinmetall GmbH, Duesseldorf, Fed. Rep. of Germany

[21] Appl. No.: 608,902

[22] Filed: May 10, 1984

[30] Foreign Application Priority Data

Jul. 1, 1983 [DE] Fed. Rep. of Germany ....... 3323713

[51] Int. Cl.[4] ............................................. F41F 19/08
[52] U.S. Cl. .................................................. 89/43.01
[58] Field of Search ............................. 89/43.01, 43.02

[56] References Cited

U.S. PATENT DOCUMENTS 463,463 11/1891 Spiller ................................ 89/43.01
715,839 12/1902 McClean ........................... 89/43.01

FOREIGN PATENT DOCUMENTS 348321 2/1922 Fed. Rep. of Germany .

OTHER PUBLICATIONS

Rheinmetall Handbook on Weaponry, Second English Edition, 1982, p. 377.

Primary Examiner—Stephen C. Bentley

[57] ABSTRACT

A pneumatic recuperator mechanism has a sealable valve which communicates a storage chamber with a displacement chamber; the mechanism includes a recoil piston which is connected to the gun barrel and is slidable jointly with a piston rod; the mechanism is improved in such a way, that with a predetermined built-in cross section a simple and light recuperator mechanism with a high heat-free operative readiness is formed.

This object is achieved in that the displacement chamber 1 and the storage chamber 2 have the same inner diameter d and are arranged within only one cylinder 3, whereby the recoil piston 5 and the valve 6 are slidably received by the inner wall 4 of the cylinder 3. The valve 6 is advantageously in the shape of a disc and the recoil piston 5 is offset relative thereto. The valve 6 as well as the recoil piston 5 are provided with wear-resistant and delay-free seals 18, 24, 36 and guide bands 7, 23. The arrangement of the recoil piston 5 and the valve 6 permit a lower operative pressure level of the pneumatic working medium with a higher delay-free operative readiness.

7 Claims, 2 Drawing Figures

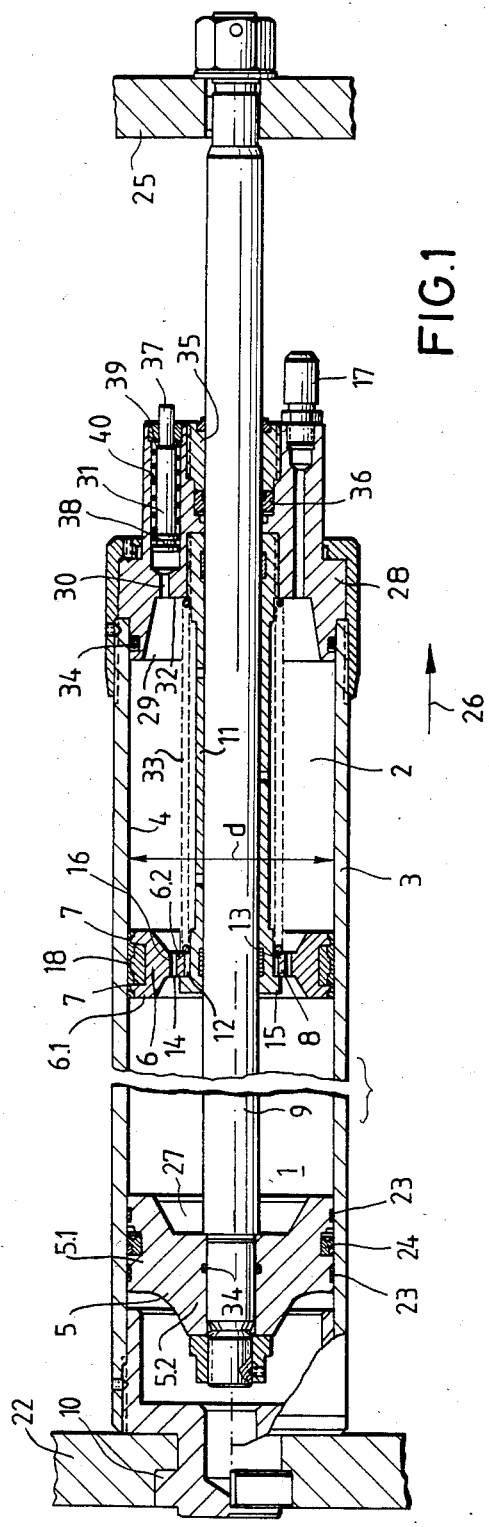
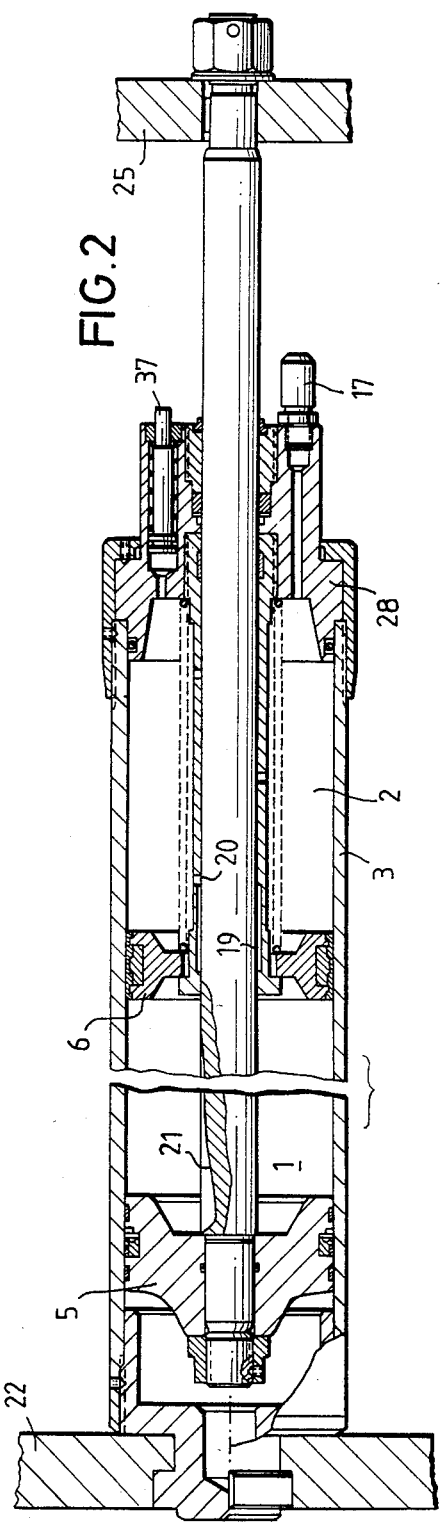

PNEUMATIC RECUPERATOR MECHANISM FOR A GUN BARREL

BACKGROUND OF THE INVENTION

The invention relates to a pneumatic recuperator mechanism for a gun barrel.

Such recoil brakes or recuperator mechanisms are illustrated in FIG. 879, page 377 of the "Rheinmetall Handbook on Weaponry, second English edition, published by Brenners Druckerei Breidenstein GmbH., Frankfurt am Main, West-Germany. Such recuperator mechanisms consist of a displacement cylinder and a storage cylinder which encloses the displacement cylinder. Within the displacement cylinder a piston and piston rod is slidably mounted, which when a shot is fired from a gun barrel transports as a result of the recoiling gun barrel gas from the displacement cylinder via a valve opening into the larger dimensioned recuperator cylinder. The displacement cylinder is for purposes of rapidly evacuating it provided with a check valve closing the outer cover, mounted at the end of the displacement cylinder which is not sealed off by the piston. The counter recoil is effected by the decompression of the compressed gases at the exit pressure. The counter recoil is throttled via a constant throttle. For purposes of sealing the axially slidable piston and piston rod there serve ring seals, which must be greased by means of pressure loaded grease lubricating chambers. These grease lubricating chambers require, however, an additional space for the oil, respectively grease volume, which must be refilled in relatively short periods of waiting time, whereby they can occur disadvantageous disruptions not only during a state of rest but also during firing operations. For controlling the ready to operate condition it is further necessary to indicate the pressurized condition of the lubricant. As result of the relatively small piston surface of the counter recoil piston there is required a high pressure level for the counter recoil, whereby the wall thickness of the arrangement must be increased which makes for a heavy recuperator mechanism and as a result of the complex construction a high finishing input is required.

In contra-distinction thereto the invention has as an object to avoid the afore-described drawbacks and to improve the recuperator mechanism of the afore-described type in such a way that with equal predetermined constructional cross section a simply constructed and thereby lighter recuperator mechanism with a higher operative readiness having less delays is provided.

The pneumatic recuperator mechanism has, according to the invention, the decisive advantage that it only requires one cylinder for the displacement chamber and the storage chamber. With a cross section of the same size as compared to that of the known recuperator cylinder there results a storage chamber, which corresponds to the displacement chamber insofar as the inner diameter is concerned, and only requires a comparatively low pressure level. Thereby there results jointly with the slidable arrangement of the valve within the single cylinder a simple and particularly weight-saving construction, whereby for example in an advantageous manner the weight-savings can be used for an increased armor protection.

A high operative readiness with less delays is achieved with the recuperator cylinder in such a way that the recuperator piston and valve contain on their outer surfaces which slide along the cylindrical inner walls, in addition to exchangeable, friction-poor guide elements also wear and delay-free sealing elements. The valve is during recoil in the cross piece region tightly sealed in such a way that in the exterior region by a delay-free seal along a ring surface of smaller diameter with a relatively high specific pressure relative to the socket, the counter recoil velocity is exclusively controlled via a throttle valve with constant or variable cross section.

By using an indicating arrangement for indicating the pressure of the pneumatic operating medium there is centrally advantageously readable the operative condition of the recuperator mechanism.

According to a further feature of the invention the recuperator piston is offset relative to the valve, whereby a reduction of the cylinder length and thereby a further weight-saving of the recuperator cylinder is achieved.

The invention is hereinafter described in conjunction with drawings in which preponderantly there has been omitted constructional details not relevant to the invention and which illustrate the preferred embodiments;

IN THE DRAWINGS

FIG. 1 is an axial sectional view of the recuperator mechanism after the counter recoil has been terminated, whereby the valve includes a throttle with constant cross section;

FIG. 2 is an axial cross sectional view of the recuperator mechanism of FIG. 1, however, with a throttle valve cross section in a condition which influences the counter recoil velocity.

DETAILED DESCRIPTION

In FIG. 1 there is illustrated a recuperator cylinder, the cylinder 3 of which at its forward end is provided with a bayonet type flange 10 which is fixedly connected with a schematically indicated cradle 22. Within the cylinder 3 there is slidable a recoil piston 5 secured to a piston rod 9. The piston rod 9 which extends through the rear bottom 28 is secured exteriorly from the cylinder 3 to a weapon breech lug 25. The cylinder 3 which is constructed as a thin-walled pipe contains an inner wall 4 with constant diameter d. A thin-walled bushing 11 fixedly connected to the bottom 28 which encloses the piston rod 9, projects into the inner chamber of the cylinder 3 and forms with the projection 15 a seat 12 of a valve 6 slidably displaceable along the inner wall 4. The inner space, which on the one hand, is sealed to the outside via the counter-recoil piston 5 and, on the other hand, by the bottom 28 is, by means of the valve 6, divided into a lengthwise adjustable displacement chamber 1, disposed between the counter-recoil piston 5 and the valve 6, and into a storage chamber 2.

The valve 6 is in the shape of a disc and includes at the region 6.1, bearing against the inner wall 4 one or more exchangeable, low-friction guide elements 7 and a wear-resistant seal ring 18, as well as in the inner region 6.2, a sealing member 8, which under the pressure of a spring 33 closes the storage chamber 2 relative to the displacement chamber 1. The sealing member 8 consists of an inwardly directed narrow cross member 13 which reduces the region 6.1. The cross member 13 is disposed in the inner region 6.2 of the sealing member 8 and region 6.1 which abuts against the inner wall 4 is reduced. The side 14 of which confronting the displacement chamber 1, at closed valve 6 condition, bears radially against the seat 12 of the bushing 11. The cross member 13 of the sealing member 8 is provided with one or more throttle openings 16 having a constant cross section, whereby during the counter-recoil movement of the counter-recoil piston 5 the pressure medium pneumatically streaming from the storage chamber 2 into the displacement chamber 1 is throttled. For achieving a short throttle path one or more arranged throttle openings 16 can be arranged so as to extend parallel to the piston rod 9 within the cross member 13 between the seat 12 and the guide element 7. By means of the throttle opening 16 and the throttles 19, 20, 21 illustrated in FIG. 2 as well as the valve in the region 6.1, 6.2 there is possible a sealing, which controls exclusively the counter-recoil velocity via the corresponding throttle.

Similar to the valve 6 the counter-recoil piston 5 in the region 5.1 bearing against the inner wall 4 is provided with one or more exchangeable and low-friction guide bands 23 and a wear- and heat-resistant seal ring 24, whereby the region 5.1, opposite to the region 5.2 at which the piston 5 is secured to the piston rod 9 is offset relative to the valve 6. By means of a recess 27 in the counter-recoil piston 5 a maximum stroke is made possible of the recoiling weapon breech 25 by having the valve 6 in a retracted position of the counter-recoil piston 5 opened by the same and the bushing 11 in dependence to the axial depth of the recess 27 determines the maximum stroke.

The bottom 28 of the storage chamber 2 is provided with a recess 29 which reduces the dead weight, the bottom surface 32 of which includes a bore 30 for gas pressure loading an indicating arrangement 31 of an operative readiness indicator. The sealing of the counter-recoil piston 5 relative to the piston rod 9 and the sealing of the bottom 28 relative to the cylinder 3 results in a known manner by means of O-rings, whereas the sealing of the movable piston rod 9 in front of a stable guide bushing 35 is provided with a wear-resistant and heat-resistant seal 36.

The wear-resistant and heat-resistant seals 18, 24 and 36 include in a known manner a form and shape adapted to the respective operative conditions, whereby the glide surface of the cylinder 3 or the sides confronting the piston rod 9 are provided with a wear-resistant low-friction surface. By using a lubricating medium during assembly the low-friction slidability and thereby the useful life of the seals can still be increased.

According to FIG. 2 in the valve 6 there is formed in the region of the bushing 11 and the piston rod 9 a jointly formed throttling cross section which influences the counter-recoil velocity of the recoil piston 5. The piston rod 9 is thereby in the length of the displacement chamber 2 provided with a progressively decreasing cross section 21 relative to the piston 5, by means of which a throttling cross section between the bushing 11 and the piston rod 9 is achieved which influences the counter-recoil velocity of the recoil piston and thereby that of the weapon breech, whereby the bushing 11 includes a cylindrical hollow chamber 19 which is open towards the piston rod 9, and which is in communication with the storage chamber 2 via radial openings 20.

The manner of operation of the pneumatic recuperator mechanism is as follows: The storage chamber 2 and displacement chamber 1 filled with a pneumatic operating medium via a gas filling valve 17, preferably nitrogen, is compressed by the counter-recoil piston 5 via the piston rod 9 and the thereto secured weapon breech lug 25 by means of the pressure of the powder gases emanating from the gun barrel. The counter-recoil piston 5 moving in a direction 26 transports by simultaneous compression of the operative fluid medium, the fluid medium from the displacement chamber 1 into the storage chamber 2 via the valve 6 lifted off the seat 12.

After termination of the recoil the pressure of the compressed fluid medium acts on the counter-recoil piston 5 to effect a counter-recoil of the weapon breech 25, so that the gun barrel arrives again in the firing position. By virtue of the pressure of the spring 33 the valve 6 is thereby closed, so that the operative fluid medium being decompressed to the operative pressure can either via the throttle opening 16 or via the throttle opening, which changes by virtue of the changing cross section 21, be transferred from the storage chamber 2 into the displacement chamber 1 for loading the counter-recoil piston. By means of the throttle cross sections 19, 21, which vary over the length of the counter-recoil there is thereby achieved in an advantageous manner, at strongly differentiating resistance forces, a uniform counter-recoil velocity.

The operative condition of the recuperator mechanism which preferably operates under a low gas pressure level is centrally surveyed by means of a gas pressure loaded indicating arrangement 31. By means of the provided operative pressure the end 37 of a gas pressure loaded piston 38 projects out of the indicating arrangement 31 and its outer end position is limited by means of a shoulder 39. When the operative pressure is lowered the end 37 slides inwardly into the indicating arrangement 31 under the pressure of the spring 40, whereby an eventual loss of the pneumatic operative fluid medium is indicated.

The counter-recoil piston 5 effects exclusively the counter-recoil movement of the weapon breech lug 25, whereby the latter moves in an opposite direction to the direction of the arrow 26.

I claim:

1. An improved pneumatic recuperator mechanism for a weapon having a counter-recoil piston slidably mounted within a displacement and operatively connected to the gun barrel of the weapon via a piston rod, said recuperator mechanism has a self-closing valve arranged between a storage chamber and a displacement chamber disposed in said recuperator mechanism, and a throttling mechanism operatively mounted in said recuperator mechanism between said storage chamber and said displacement chamber for controlling the counter-recoil velocity and includes sealing means for preventing the escape of pneumatic pressure medium, the improvement comprising said self-closing valve is in the form of a disc, said recuperator mechanism including a cylinder the inner space of which is divided by said disc into a storage chamber and a displacement chamber, the counter-recoil piston being slidably mounted in said cylinder, said disc having at least one exchangeable low-friction guiding element mounted on its radial outer periphery which engages the inner wall of said cylinder, and said disc having a radially inner region, a sealing member is operatively mounted in said radially inner region, a thin-walled bushing having a valve seat is coaxially fixedly mounted in said cylinder, said piston rod being slidably mounted in said bushing, whereby when said bushing abuts against the valve seat of said disc the maximum axial limit of said storage chamber is determined.

2. The improved pneumatic recuperator mechanism according to claim 1, wherein the sealing member consists of a narrow cross member directed inwardly and reducing radially inwardly and the side confronting the displacement chamber radially when the valve is closed bears against a stop of the bushing of the valve seat.

3. The improved pneumatic recuperator mechanism according to claim 2, wherein for achieving a control of the throttle cross section which influences the counter-recoil velocity of the counter-recoil piston there is provided in the bushing which faces away from the valve an open cylindrical chamber relative to the piston rod, which via radial openings is in communication with the storage chamber and the piston rod in the length of the displacement chamber has a decreasing at different rate cross section towards the piston.

4. The improved pneumatic recuperator mechanism according to claim 3, wherein for the exclusive control of the counter-recoil velocity of the counter-recoil piston via the throttle mechanism the valve having a radially inner region which is sealed relative to the inner wall of the cylinder with a wear-resistant seal.

5. The improved pneumatic recuperator mechanism according to claim 4, wherein in the region of the counter-recoil piston which bears against the inner wall of the cylinder there are provided one or more exchangeable and low-friction guide bands as well as a wear-resistant and delay-poor seal.

6. The improved pneumatic recuperator mechanism according to claim 5, wherein the guide and sealing surface forming the radially outer region of the counter-recoil piston is fixed relative to the radially inner region of the piston rod and is offset with respect to the valve, whereby when the piston rod is retracted in the recoil direction the valve is opened and the bushing is overlapped by the offset region.

7. The improved pneumatic recuperator mechanism according to claim 6, wherein the bottom of the storage chamber is provided with a recess with respect to the bushing, the bottom surface of the cylinder has a bore for gas pressure loading of an indicating arrangement indicating the operative pressure.

* * * * *